Figure 1:
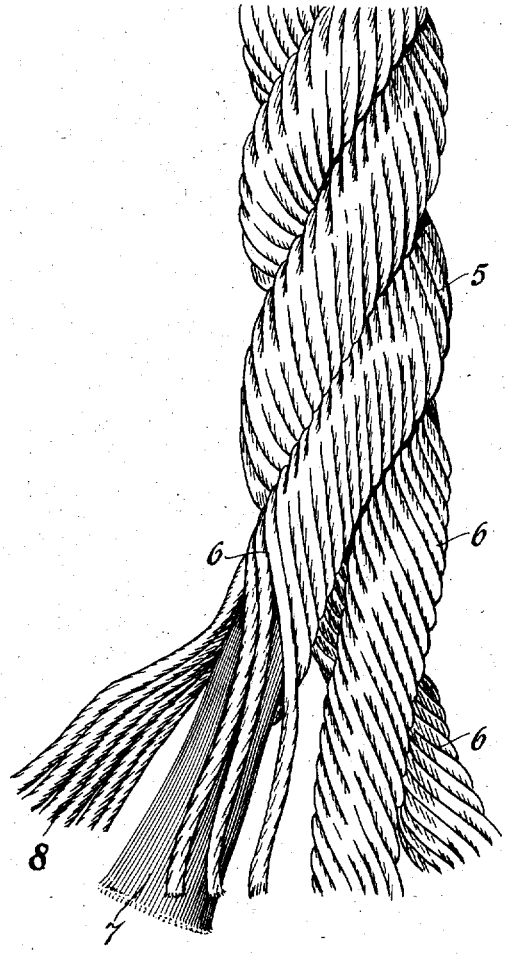

June 23, 1925. Re. 16,101

H. V. WHITLOCK

ROPE STRUCTURE

Original Filed May 25, 1922

INVENTOR
Herbert V. Whitlock
BY Kenyon & Kenyon
ATTORNEYS

Reissued June 23, 1925. Re. 16,101

UNITED STATES PATENT OFFICE.

HERBERT VERNET WHITLOCK, OF ELIZABETH, NEW JERSEY, ASSIGNOR TO WHITLOCK CORDAGE COMPANY, OF JERSEY CITY, NEW JERSEY, A CORPORATION OF NEW JERSEY.

ROPE STRUCTURE.

Original No. 1,442,796, dated January 16, 1923, Serial No. 563,598, filed May 25, 1922. Application for reissue filed December 30, 1924. Serial No. 758,947.

*To all whom it may concern:*

Be it known that I, HERBERT VERNET WHITLOCK, a citizen of the United States, and resident of Elizabeth, county of Union, and State of New Jersey, have invented Improvements in Rope Structures, of which the following is a specification.

The present invention relates to new and useful improvements in cordage and it pertains more particularly to a new and improved strand structure for ropes.

It is one of the objects of the invention to construct a rope which will be superior in performance than is rope constructed in the ordinary manner.

Heretofore the manufacture of rope has ordinarily consisted of a number of different stages. First, the preparation of the sliver comprising a continuous band made up of fibers combed and recombed so as to lie side by side in parallel relation. The fibers of manila or sisal from which rope is ordinarily made vary from 8 to 12 feet in length. The sliver has no tensile strength in lengths in excess of 10 or 12 feet for tension simply draws the fibers apart and there is no friction as between the fibers to resist their relative longitudinal movement. The next step in rope construction is to spin the sliver into the yarn. This is done by simultaneously drawing and twisting the sliver to form a yarn of uniform diameter wherein the fibers are tightly twisted about the axis of the yarn and the compression of fiber on fiber by reason of this twisted relation sets up a frictional resistance to longitudinal movement as between the fibers so that the yarn thereby achieves tensile strength. The next step is forming the strand of a multiplicity of yarns, the number of yarns depending upon the desired size of the strand to be formed. The several yarns are twisted together in the strand-forming machine, those yarns at the outside of the finished strand being called the cover yarns, and those inside being called the inner or core yarns. Finally, three or more strands so formed may be laid or twisted together to form the finished rope.

In strands so formed it will be apparent that the core structure comprises fibers which lie in composite twisted relation, that is to say, the fibers have first been twisted into yarns and the yarns have then been twisted into the strand, so that the outer fibers of adjacent yarns lie in criss-cross relation to one another at their points of contact, and, on account of the generally cylindrical shape of the individual yarns, the wear as between yarns is localized and intensified at the particular points where the yarns come together.

When a rope of ordinary construction such as described is put under tension, there is appreciable relative movement between the various parts comprising the rope structure. The yarns rub against one another in this movement and the fibers of the yarns rub across one another at the points or lines of contact. With increasing tensile strain this cross rubbing is increased with a resulting tendency to rip and shear the individual fibers at the points where the rubbing occurs and so to progressively weaken and ultimately break down the rope structure.

It has been found from actual measurement that the yarns comprising a strand are of unequal length, decreasing in length from the outside or cover yarns to the center or core yarns. Consequently as the rope stretches under tensile strain, these center yarns are the first to reach their limit of elasticity. The shortest yarns will rupture first thus reducing the efficiency of the rope by being unable to operate in unison.

It has been found by experiment that a rope made of strands comprised of fiber laid parallel to each other and in a straight line has much greater strength than a rope made in the usual manner, due primarily to the fact that the rope takes the stress as a unit.

This added strength is also in large measure due to the fact that the fibers of the core lie side by side so that each fiber is substantially in longitudinal contact throughout its length with the fibers that are adjacent to it on every side. It results from such a structure that when it is subjected to strain the longitudinal movement of the constituent parts of the rope results in a tendency of the individual fibers to move longitudinally with respect to adjacent fibers while each fiber is substantially in contact throughout its length with such adjacent fibers. The resistance to longitudinal movement is therefore substantially uniform throughout the entire length of each fiber. There is no cross rubbing of fiber on fiber nor any localizing or intensifying of the friction. Consequently, in my structure, by avoiding the compound twisted relation of the fibers which is universally found in rope structures heretofore, I have avoided the criss-cross rubbing of fiber on fiber and the resulting tendency to rip and shear the fibers under strain which necessarily takes place in the use of all such structures of the prior art. It follows that in my invention I am able to use the tensile strength of the individual fibers to the best advantage and to provide a rope which has greater strength and longer life because, due to the structure of the core, there is substantially less wear as between the fibers and more cooperation between them so that the core is capable of taking the load substantially as a unit and carrying greater strains without rupture.

In order to give the rope greater wearing qualities this strand structure has been supplemented with a covering of yarns made in the usual way. The strand structure then stands as a core of fibers protected by a cover of regulation yarns, the fibers of the core lying side by side so that each fiber is substantially in longitudinal contact throughout its length with the fibers that are adjacent to it on every side.

If in larger ropes a multiplicity of the above structures is used, it is understood to be within the spirit of this invention.

It will be understood that the particular rope structure described and illustrated herein is but one preferred embodiment of my invention, which I describe for the purpose of illustration and not of limitation, the invention being broadly defined in the claims annexed hereto.

Figure 2:
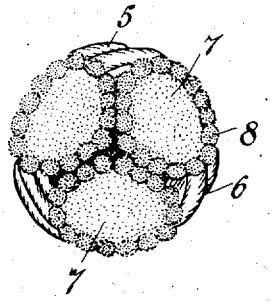

With the above and other objects in view, reference is had to the accompanying drawings, in which Fig. 1 is a view in elevation of a rope structure, one of the strands of which is frayed to show the interior structure thereof, and Fig. 2 is an end view of a length of rope constructed in accordance with the present invention.

Referring more particularly to the drawings, the reference character 5 designates a rope structure, said rope structure comprises a plurality of strands 6 laid together in the ordinary manner employed in the manufacture of rope. Each of the strands comprises a core 7 formed of straight fibers laid in parallelism to one another, and each of these strands is enclosed in a covering 8 consisting of a plurality of covering yarns. A sufficient number of covering yarns 8 is employed to form a complete wrapping of the core 7 to protect the same and prevent disintegration of said core.

I am aware that twine has been made by taking relatively short lengths of palmetto or other vegetation and laying them in parallelism and subsequently binding them with a wire, which binding wire passes spirally around the structure. Such a structure, however, is not adaptable to use in ropes since such a structure could not travel over sheaves and pulleys without rapid disintegration of the mass which would result from the fact that the fibers used are of comparatively short length.

I am also aware that cord has been made up of bundles of fibrous materials or yarns bound together by a winding of covered wire, yarns, strands or the like. Such structures are entirely distinct from my invention since the fibrous materials or yarns found in such structures in every instance consist of fabricated materials which are continuous for the length of the cord, such materials being generally threads or yarns or the like made up by spinning, i. e., drawing and twisting fibers. Accordingly in such structures the fibers do not lie side by side substantially throughout their length, but on the contrary they lie in criss-cross relation so that relative movement of the elements under strain results in the ripping or shearing tendency of fiber rubbing across fiber, which my invention avoids.

I understand that the suggestion has been made of making inextensible single strand rope by the use of a core of horse hair and three layers of cover yarns, each layer being twisted in the opposite direction to adjacent layers to form a strand that cannot become untwisted. Such an arrangement is wholly distinct from my invention. It is obviously difficult and expensive to manufacture. Its inextensibility materially limits its usefulness. But the most important is the fact that it is incapable of being employed in the manufacture of multi-strand rope. For in order to make a stable multi-strand rope structure, i. e., one that will not come untwisted, it is necessary to form it of unstable strands, i. e., strands which constantly tend to untwist themselves, and to lay these strands into the rope so that the tendency of the rope as a whole to come untwisted by the straightening out of the individual strands is counterbalanced by the tendency of the strands themselves to come untwisted by the straightening out of the twisted elements of which they are made. The stability of the finished rope is thus dependent on the balance of instability of its parts. For this reason rope cannot be made out of stable strands, for there would be nothing in such a structure to counteract the tendency of the strands to straighten out and so untwist the rope, and accordingly it would be unsalable and inoperative as a rope. This would be particularly true of a rope made up of stable strands with horse-hair cores (if such a structure could be made) because of the stiffness and relative inflexibility of such strands.

From the foregoing it is apparent that the present invention provides a new and improved form of strand structure, and, furthermore, a rope constructed in accordance with the present invention possesses greater strength and durability than is possible in rope manufactured in the ordinary manner.

What is claimed is:

1. A rope structure comprising a plurality of strands laid together in twisted relation to form the finished rope, each of said strands comprising a core of fibers laid parallel to one another in substantially untwisted relation and a covering of spun yarns, said yarns being spirally laid about the core and in contact with one another throughout their length.

2. A rope structure comprising a plurality of unstable strands twisted together to form the finished rope, each strand comprising a core and a protective covering of yarns, said yarns being helically wound about the core and in contact with one another throughout their length, said core comprising fibers lying side by side so that each fiber is substantially in longitudinal contact throughout its length with the fibers that are adjacent to it on every side, the said strands being laid into the rope in such manner that the tendency of said rope structure to untwist is opposed by the counter-rotating tendency of the said unstable strands.

3. In multi-strand rope structure wherein the untwisting tendency of the individual strands opposes the tendency of the rope as a whole to come untwisted, an unstable strand comprising a core and a protective covering of yarns, said yarns being helically wound about the core and in contact with one another throughout their length, said core comprising fibers lying side by side in substantially parallel relation so that each fiber is substantially in longitudinal contact throughout its length with the fibers that are adjacent to it on every side.

4. A stable rope structure comprising a plurality of unstable strands twisted together to form the finished rope, each strand comprising a core and a continuous protective covering of yarns, said yarns being helically wound about the core, said core comprising fibers lying side by side and characterized by the fact that relative movement of the fibers under tensile strain is resisted by friction between adjacent fibers operating substantially uniformly throughout the length of the fibers respectively.

5. Rope structure comprising a plurality of strands laid together in twisted relation to form the finished rope, each of said strands comprising a core of fibers lying side by side so that each fiber is substantially in longitudinal contact throughout its length with the fibers that are adjacent to it on every side, and a covering of spun yarns laid about the core to provide a continuous covering therefor, the said strands being laid into the rope in such manner that the tendency of each individual strand to untwist opposes the untwisting tendency of the rope as a whole.

6. A multi-strand rope structure wherein the untwisting tendency of the individual strands opposes the untwisting tendency of the rope as a whole comprising a plurality of unstable strands, each strand comprising a core and a continuous protective covering of yarns, said yarns being helically wound about the core, said core comprising fibers lying side by side in substantially parallel relation, and characterized by the fact that relative movement of the fibers under tensile strain is resisted by friction between adjacent fibers operating substantially uniformly throughout the length of the fibers respectively.

7. A stable rope structure comprising a plurality of unstable strands twisted together to form the finished rope, each strand comprising a wear-resisting cover and a tensile core, said core consisting of a unitary group of fibers lying side by side in substantially continuous longitudinal contact with adjacent fibers.

8. A multi-strand rope structure wherein the untwisting tendency of the individual strands opposes the untwisting tendency of the rope as a whole, comprising a plurality of strands, each strand comprising a helically wound wear-resisting cover and a tensile core, the core being made up of fibers so positioned that tensile strain results in relative movement of fiber along fiber in longitudinal direction substantially without cross rubbing.

9. A stable rope structure comprising a plurality of unstable strand structures laid together in twisted relation to form the finished rope, each strand structure comprising a wear-resisting cover and a tensile core consisting of fibers lying side by side so that adjacent fibers are in substantially continuous longitudinal contact.

10. In multi-strand rope structure wherein the untwisting tendency of the individual strands opposes the tendency of the rope as a whole to become untwisted, an unstable strand comprising a core of fibers laid parallel to one another substantially without cross contact between the fibers and a covering of yarns, said yarns being helically wound about the core and in contact with one another through their length.

In testimony whereof, I have signed my name to this specification.

HERBERT VERNET WHITLOCK.